(12) United States Patent
Carl et al.

(10) Patent No.: US 11,220,295 B2
(45) Date of Patent: Jan. 11, 2022

(54) BODYWORK STRUCTURE AND BODYWORK FOR A PASSENGER VEHICLE

(71) Applicant: Daimler AG, Stuttgart (DE)

(72) Inventors: Michael Carl, Gerlingen (DE); Volker Rudlof, Rangendingen (DE); Daniel Doerr, Stuttgart (DE)

(73) Assignee: Daimler AG, Stuttgart (DE)

( * ) Notice: Subject to any disclaimer, the term of this patent is extended or adjusted under 35 U.S.C. 154(b) by 36 days.

(21) Appl. No.: 16/960,506

(22) PCT Filed: Dec. 10, 2018

(86) PCT No.: PCT/EP2018/084082
§ 371 (c)(1),
(2) Date: Jul. 7, 2020

(87) PCT Pub. No.: WO2019/134785
PCT Pub. Date: Jul. 11, 2019

(65) Prior Publication Data
US 2020/0385060 A1 Dec. 10, 2020

(30) Foreign Application Priority Data
Jan. 8, 2018 (DE) .................... 10 2018 000 065.7

(51) Int. Cl.
*B60J 7/00* (2006.01)
*B62D 21/15* (2006.01)
(Continued)

(52) U.S. Cl.
CPC ............ *B62D 21/152* (2013.01); *B60R 19/18* (2013.01); *B60R 19/26* (2013.01); *B62D 21/03* (2013.01); *B60R 2019/1806* (2013.01)

(58) Field of Classification Search
CPC ...... B62D 21/11; B62D 21/02; B62D 21/152; B62D 25/20; B62D 21/157; B60R 19/18;
(Continued)

(56) References Cited

U.S. PATENT DOCUMENTS

| 8,596,711 B2 * | 12/2013 | Yasui | B62D 25/082 |
| | | | 296/187.09 |
| 2008/0067838 A1 * | 3/2008 | Nakamae | B62D 25/084 |
| | | | 296/203.02 |

(Continued)

FOREIGN PATENT DOCUMENTS

| DE | 195 32 531 A1 | 3/1997 |
| DE | 102 55 968 A1 | 6/2004 |

(Continued)

OTHER PUBLICATIONS

PCT/EP2018/084082, International Search Report dated Mar. 19, 2019 (Two (2) pages).

*Primary Examiner* — Kiran B Patel
(74) *Attorney, Agent, or Firm* — Crowell & Moring LLP

(57) ABSTRACT

A bodywork structure for a passenger vehicle includes a bodywork shell construction with two longitudinal girders and a flexible crossmember device attached to the two longitudinal girders. The flexible crossmember device has a first flexible crossmember and two energy absorption elements where the two energy absorption elements are respectively fixed to the two longitudinal girders and the first flexible crossmember is connected to the two longitudinal girders via the two energy absorption elements. A support framework is disposed between the two longitudinal girders and has a second flexible crossmember that is at least indirectly connected to the two longitudinal girders and is convexly curved in a direction of the first flexible crossmember. The support framework has a load divider disposed between the first flexible crossmember and the second (Continued)

flexible crossmember in the longitudinal direction of the passenger vehicle and extending in the transverse direction of the passenger vehicle.

13 Claims, 8 Drawing Sheets

(51) Int. Cl.
 *B60R 19/18* (2006.01)
 *B60R 19/26* (2006.01)
 *B62D 21/03* (2006.01)
(58) Field of Classification Search
 CPC ........................... B60R 19/34; B65H 2220/02;
 B65H 2220/01; B65H 2220/04
 See application file for complete search history.

(56) References Cited

U.S. PATENT DOCUMENTS

2010/0171340 A1 7/2010 Yasuhara et al.
2015/0166108 A1* 6/2015 Persson ................ B62D 21/152
 296/187.09
2015/0360633 A1* 12/2015 Nishida ................ B62D 25/082
 293/133
2017/0036699 A1* 2/2017 Asai ..................... B62D 25/082
2017/0050674 A1* 2/2017 Wolf-Monheim ..... B62D 21/11
2017/0129432 A1* 5/2017 Daido .................. B62D 21/152
2018/0257586 A1* 9/2018 Kitakata ................ B60J 5/0484
2019/0084512 A1* 3/2019 Takayanagi ............. B60R 19/22
2019/0106072 A1* 4/2019 Uchiba .................. B60R 19/34
2019/0176732 A1* 6/2019 Lucas-Nuelle ......... B60R 19/18

FOREIGN PATENT DOCUMENTS

| DE | 10 2006 038 674 A1 | 2/2008 |
| DE | 10 2008 010 553 A1 | 8/2009 |
| DE | 10 2012 221 181 A1 | 5/2014 |
| DE | 10 2012 220 871 A1 | 6/2014 |
| DE | 10 2815 016 186 A1 | 6/2017 |
| GB | 2 457 591 A | 8/2009 |
| JP | 2017-226269 A | 12/2017 |

* cited by examiner

BODYWORK STRUCTURE AND BODYWORK FOR A PASSENGER VEHICLE

BACKGROUND AND SUMMARY OF THE INVENTION

The invention relates to a bodywork structure for a passenger vehicle and a bodywork for a passenger vehicle.

Such bodywork structures for passenger vehicles are sufficiently known from serial vehicle construction. Such a bodywork structure usually comprises two longitudinal girders that are spaced apart from each other in the transverse direction of the vehicle and are allocated to a longitudinal girder plane, for example. Moreover, the bodywork structure comprises at least one flexible crossmember device attached to the longitudinal girders in the longitudinal direction of the vehicle or following on the longitudinal girders, the flexible crossmember device having a flexible crossmember extending at least in the transverse direction of the vehicle and at least one energy absorption element, also referred to as a crash box, per longitudinal girder. The respective energy absorption element is fixed to the respectively allocated longitudinal girder on a fixing plane. Moreover, the flexible crossmember is fixed to the energy absorption element, such that the flexible crossmember is connected to the respective longitudinal girders through the intermediary of the energy absorption elements. Thus, for example, the flexible crossmember can absorb loads caused by an accident, distribute them in the transverse direction of the vehicle and transfer them to the energy absorption elements, such that the flexible crossmember and, in particular, the energy absorption elements are deformed by energy consumption. In doing so, energy from an accident can be relieved or absorbed.

By integrating additional components, such as a third row of seats and/or high-voltage components for electric or hybrid vehicles, for example, into an existing structural work platform, the deformation region available for relieving energy in the event of an accident can be significantly limited in the front or rear region of the motor vehicle, such that it is desirable to keep intrusions particularly minimal in the event of an accident in order to protect occupants of the passenger vehicle and/or the high-voltage components. By means of a stronger and stronger blocking of vehicles on a common bodywork platform, it is furthermore desirable to also achieve such a protective function with vehicle variants with high standing heights, such as SUVs, for example, even when an existing longitudinal girder structure is driven under by an obstacle from an accident in the event of an accident. Here, the aim is to keep deformations in the vertical direction of the vehicle (z-direction) and in the longitudinal direction of the vehicle (x-direction) as low as possible, yet without excessively reducing construction space above the longitudinal girders.

A motor vehicle having at least one hollow longitudinal girder emerges from DE 10 2006 038 674 A1, on the end of which a bumper or, alternatively, a front module or a rear module is to be attached.

A front part of a motor vehicle bodywork emerges from JP 2017 226269 A, comprising two support framework structures that are spaced apart from each other in the transverse direction of the vehicle and are formed to be Y-shaped and are arranged in a V-shape in relation to the longitudinal direction of the vehicle. On the end side, a flexible crossmember of a bumper arrangement is held on the two support framework structures. A strut that connects these to one another and is respectively angled on the end side is fixed between the support framework structures, the strut counteracting the support framework structures spreading out in the event of a partially covered frontal collision of the motor vehicle.

The object of the present invention is to develop a bodywork structure and a bodywork of the kind mentioned above in such a way that particularly advantageous accident behavior can be achieved in a particularly favorable manner in terms of construction space.

The bodywork structure is part of a bodywork upper housing of a passenger vehicle and comprises two longitudinal girders spaced apart from each other in the transverse direction of the vehicle, the longitudinal girders being able to be found in the front part or in the rear car region. Furthermore, at least one flexible crossmember device attached to the longitudinal girders in the longitudinal direction of the vehicle is provided, which is part of a bumper arrangement and comprises a first flexible crossmember as well as energy absorption elements fixed to the longitudinal girders, often also referred to as crash boxes, via which the first flexible crossmember is connected to the respective longitudinal girders, i.e., preferably releasable fixed without destruction. The bodywork structure is characterized in that a support framework is provided which is arranged between the longitudinal girders and, when seen in the vertical direction of the vehicle, arranged at the height of the longitudinal girders, wherein the support framework has a second flexible crossmember connected at least indirectly to the longitudinal girders and convexly curved in the direction of the first flexible crossmember when seen in top view of the bodywork structure in relation to the outside of the vehicle. The second flexible crossmember is thus convexly curved in the direction of the collision load acting in the event of a vehicle collision on the end side and is thus outwardly curved in the longitudinal direction of the vehicle. By means of this outwardly curved, preferably arcuate shape of the second flexible crossmember, a force caused by an accident acting at least substantially in the longitudinal direction of the vehicle is transferred or converted into a force acting at least substantially in the transverse direction of the vehicle, in particular outwardly, whereby the longitudinal girders are supplied with force by the connection of the support framework in the transverse direction of the vehicle, in particular outwardly, and are also deformed when a limit force is exceeded. The existing longitudinal girder structures are connected to one another on the xz-plane spanned in the common vehicle coordinate system in the longitudinal direction of the vehicle (x-direction) and vertical direction of the vehicle (z-direction) by means of the support framework according to the invention, i.e., by means of the additional inner second flexible crossmember, whereby, in the event of a crash, early buckling of the longitudinal girders is avoided and, in particular with a partial overlap with the collision partner, the energy from the accident is simultaneously better transferred to the side facing away from the collision, whereby the whole intrusion into the vehicle is minimized and the crash energy arising can be relieved in the remaining deformation region. The arcuate second flexible crossmember convexly curved towards the first flexible crossmember is thus virtually pressed together in the event of an impact force acting in the longitudinal direction of the vehicle, such that the application of force to the longitudinal girders at least also takes place in the transverse direction of the vehicle (y-direction). The building load path here thus undergoes a deflection out of the x-direction towards the longitudinal girders in the transverse direction of the vehicle. The support framework has a load divider arranged between the first flexible crossmember and the second flexible crossmember in the longitudinal direction of the vehicle and extending in the transverse direction of the vehicle, via which load divider loads caused by an accident and acting on the load divider, for example, can particularly advantageously be distributed in the transverse direction of the vehicle and transferred to the second flexible crossmember.

One exemplary embodiment of the bodywork structure is particularly preferred in which the load divider is fixed to or formed on the second flexible crossmember in such a way that the free ends of the load divider are not connected to the longitudinal girders. This means the load divider does not have a direct connection that absorbs transverse forces or introduces them into the longitudinal girders to the longitudinal girders in the state when mounted to the vehicle. At least the end regions of the load divider freely protrude to the left and right from the connection point or points on the second flexible crossmember in the direction of the longitudinal girders. According to a preferred first embodiment variant, the load divider is fixed to the second flexible crossmember, while, according to a second embodiment variant, the load divider is formed, for example moulded, on the second flexible crossmember.

In an advantageous exemplary embodiment of the bodywork structure, it is provided that the load divider is fixed at least indirectly, in particular directly, to an end face of the second flexible crossmember, the end face facing towards the first flexible crossmember in the longitudinal direction of the vehicle. This end face forms or is the back of the arc of the curved/arced second flexible crossmember. In doing so, the load divider can particularly advantageously absorb loads caused by an accident, distribute them and transfer them to the second flexible crossmember, which can then, for its part, absorb, distribute and specifically guide the loads caused by the accident. According to an advantageous exemplary embodiment, the fixing point or the fixing portion of the load divider on the second flexible crossmember is in the region of the vertex or the vertex portion of the load divider, i.e., in the region which is closest to the flexible crossmember.

In principle, it is possible that the load divider is formed to be beam-shaped. Here, the construction of the load divider can be similar to a bodywork support, i.e., as a hollow profile, for example, which is designed in one piece as an extrusion profile, for example, or in several pieces, in particular in a shell construction. The load divider can be formed to be straight or, on the other hand, can have a specific curvature in the transverse direction of the vehicle, wherein the alignment of the curvature is directed in the same direction as that of the convexly curved second flexible crossmember.

A further advantageous embodiment of the invention is characterized in that the load divider is formed in one piece. Here, the load divider is formed as exactly one component, which can be handled and mounted as a whole. Alternatively, it is provided that the load divider is formed in several pieces and thus has, for example, several, i.e., at least two, load divider parts formed separately from each other and completely spaced apart from each other, for example, whereby the absorption and guidance of loads caused by accidents can be adjusted in a targeted manner.

One exemplary embodiment of the bodywork structure is particularly preferred in which the second flexible crossmember is connected to the longitudinal girders in such a way that, in the event of application of force to the second flexible crossmember acting in the longitudinal direction of the vehicle, a load path can be formed via this to respective inner sides, pointing inwards in the transverse direction of the vehicle, of the respective longitudinal girders. To do so, the second flexible crossmember is either fixed immediately, i.e., directly, or indirectly, for example with the aid of fixing consoles, to the respective inner side of the longitudinal girders.

In another embodiment variant, a connection of the second flexible crossmember to the upper side and/or the lower side of the longitudinal girders is provided, wherein here the connection is also such that, in the event of a crash, a load path can respectively be constructed from the second flexible crossmember laterally into the longitudinal girders via their inner sides facing towards one another. To do so, it is necessary for the end regions of the second flexible crossmember to be held at the height of the longitudinal girders at least in partial opposition to the longitudinal girder inner sides.

In a first exemplary embodiment of the bodywork structure, it is provided that the support framework and thus the load divider and the second flexible crossmember are arranged on the longitudinal girders within a fixing plane of the energy absorption elements in the longitudinal direction of the vehicle, such that, for example when the bodywork structure according to the invention is provided on the front of the passenger vehicle, the fixing plane is arranged further forwards in the longitudinal direction of the vehicle than the support framework. In this context, the term "fixing plane" is to be understood as a region/portion that extends spatially in the longitudinal direction of the vehicle and that, depending on the kind of connection of the energy absorption elements to the longitudinal girders, i.e., inserted on the end face by means of a flange connection or into the end region of the hollow longitudinal girder and fixed in the overlapping region in the transverse direction of the vehicle by securing means, can have a different extension.

In another particularly advantageous exemplary embodiment of the invention, the load divider is in the region of this fixing plane, i.e., the load divider is between or at least partially between the energy absorption elements and, when seen in the vertical direction of the vehicle, also at the height thereof, and thus preferably in a region of the energy absorption elements in which these do not deform in the event of a collision or are already deformed on block. The load divider is thus preferably not supplied with force in a so-called repair crash, for example the standardized RCAR crash test (Research Council for Automobile Repairs), or at least only supplied with minimal forces in such a way that it preferably does not have to be exchanged. The energy-consuming deformation of the energy absorption elements is thus not influenced by the load divider. In the event of a crash, the load divider is instead only also linked to the load path when, in the event of certain crash forces introduced to the shell construction by a collision by the vehicle being exceeded, the deformations of the first flexible crossmember and/or the energy absorption elements are correspondingly further advanced.

For example, if the bodywork structure according to the invention is provided on the rear of the passenger vehicle, then the fixing plane, for example, is arranged further back than the support framework or the second flexible crossmember in the longitudinal direction of the vehicle. This means that the bodywork structure according to the invention can be used both for the front and for the rear of the passenger vehicle in order to thus be able to achieve particularly advantageous accident behavior in a manner that is favorable in terms of construction space. The support framework provided according to the invention is also referred to as the support framework structure, by means of which the longitudinal girders forming a longitudinal girder structure can be connected to one another on a plane spanned by the longitudinal direction of the vehicle (x-direction) and the vertical direction of the vehicle (z-direction) that is also referred to as the XZ plane, whereby, in the event of an accident formed as a rear or front collision, for example, early buckling of the existing longitudinal girders is avoided and, simultaneously, energy from the accident is particularly advantageously transferred to the side facing away from the impact.

In doing so, the overall intrusion into the passenger vehicle can be kept particularly minimal, and the emerging energy from the accident can be relieved or absorbed particularly advantageously in a remaining deformation region and here converted into deformation energy. Relieving the energy can be improved by the support framework via the longitudinal girders in the longitudinal direction of the vehicle. In addition, energy from the accident can be relieved in the transverse direction of the vehicle (y-direction), whereby the overall intrusion into the passenger vehicle or into its interior can be kept particularly low. An excessive impact on construction space above the longitudinal girders can here be avoided, such that this construction space, for example, is available for accommodating further components, such as high-voltage components, for example, or a third row of seats. The support framework provided according to the invention makes it possible, in particular, in the event of an accident to use an available deformation region in a very limited manner, for example, by integrating additional components such as a third row of seats and/or high-voltage components for electric-hybrid vehicles into an existing shell construction platform for relieving energy particularly well, such that, even in the event of only a minimal available deformation region, a particularly large amount of energy from the accident can be absorbed. The support framework can particularly advantageously be used as a load divider or for load dividing for an electric vehicle with an engine unit without excessively loading the whole construction space between the longitudinal girders.

In a particularly advantageous embodiment of the invention, the flexible crossmembers and the load divider have respective hollow cross-sections mutually overlapping at least partially in the longitudinal direction of the vehicle, in particular closed hollow cross-sections, at least in respective longitudinal regions. In other words, it is provided here that the flexible crossmembers and the load divider are arranged in the vertical direction of the vehicle in such a way that the hollow cross-sections are mutually covered or overlap in the longitudinal direction of the vehicle. Thus, even with only a minimal available deformation region, a particularly high amount of energy from the accident can be absorbed, whereby particularly advantageous accident behavior can be achieved.

In order to be able to achieve particularly advantageous guiding and deflection of loads caused by an accident and, as a result, particularly advantageous deformation behavior, it is provided in a further embodiment of the invention that the load divider is at least indirectly, in particular directly, fixed to the second flexible crossmember.

In a further embodiment of the invention, the second flexible crossmember is at least indirectly, in particular directly, connected to respective inner sides, pointing inwardly in the transverse direction of the vehicle, of the respective longitudinal girders. In doing so, a particularly advantageous application of force to the longitudinal girder can be achieved, such that its deformation or deformation behavior can be adjusted as needed.

A further advantageous embodiment of the invention provides that the second flexible crossmember is connected to the respective longitudinal girders through the intermediary of respective consoles formed separately from the second flexible crossmember and separately from the longitudinal girders and connected to the second flexible crossmember and to the longitudinal girders. In this way, the second flexible crossmember can be connected to the longitudinal girders in a targeted manner as needed. Moreover, the application of force to the longitudinal girders can be specifically adjusted.

A further embodiment is characterized in that the second flexible crossmember is formed integrally and thus as exactly one coherent component. In this way, the second flexible crossmember, for example, can be handled and installed as a whole, such that the second flexible crossmember can be mounted in a time and cost-effective manner. Moreover, advantageous deformation behavior of the second flexible crossmember can thus be achieved.

Alternatively, it has been shown to be particularly advantageous when the second flexible crossmember is formed in several pieces and thus has at least two flexible crossmember parts formed separately from each other, which are arranged spaced apart from each other in the transverse direction of the vehicle. Thus, the flexible crossmember parts are arranged at a distance apart from one another running in the transverse direction of the vehicle, the distance apart preferably being bypassed by the load divider. Thus, the load divider is connected both to one of the flexible crossmember parts and to the other flexible crossmember, such that a particularly advantageous absorption, transfer, guide and support of loads caused by an accident can be achieved.

A bodywork for a passenger vehicle is also part of the invention, having a shell construction and having a bodywork structure according to the invention. Here, the bodywork is formed, in particular, as a self-supporting bodywork. The advantages mentioned above in the context of the bodywork structure according to the invention apply in the same way to the bodywork according to the invention.

Here, it has been shown to be particularly advantageous when the support framework is fixed to the shell construction without destruction or in a reversibly releasable manner. The support framework is thus a mounting solution, with which the passenger vehicle can be equipped in a simple manner and as needed. As a mounting solution, the support framework, for example, can also only be used in those vehicles that have certain equipment variants, such as a third row of seats, for example, whereby a base or corner-type load of the bodywork upper housing in terms of its overall weight can be avoided. For example, if several vehicle variants based on a common platform are provided, then it is possible to equip at least one first part of the vehicle variant with the support structure by the support framework being simply fixed to the respective shell construction. Equipping or fitting at least one second part of the vehicle variant with the support structure can simply be omitted in order to not thus load the corner type.

The subject matter of the invention also relates to a mounting component for a bodywork structure comprising the second flexible crossmember, which, on its ends, is respectively provided with a console for fixing this on the inner sides of the longitudinal girders of a passenger vehicle, and the load divider provided on the second flexible crossmember. Preferably, the mounting component is screwed to the longitudinal girders in the transverse direction of the vehicle.

Further advantages and details of the invention emerge from the below description of a preferred exemplary embodiment as well as from the drawings. The features and feature combinations mentioned above in the description and the features and feature combinations mentioned below in the description of the Figures and/or only shown in the Figures can be used not only in the respectively stated combination but also in other combinations, or on their own, without leaving the scope of the invention.

DETAILED DESCRIPTION OF THE DRAWINGS

Figure 1:
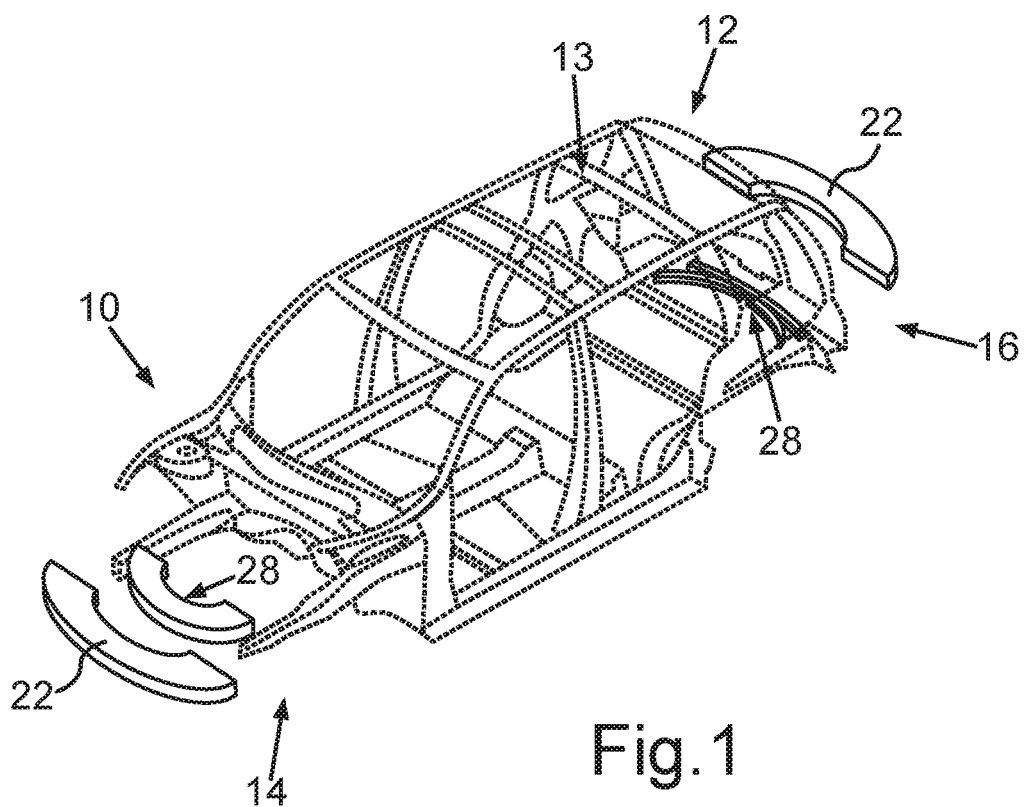
FIG. 1 is a schematic perspective view of a bodywork for a passenger vehicle.
Figure 4:
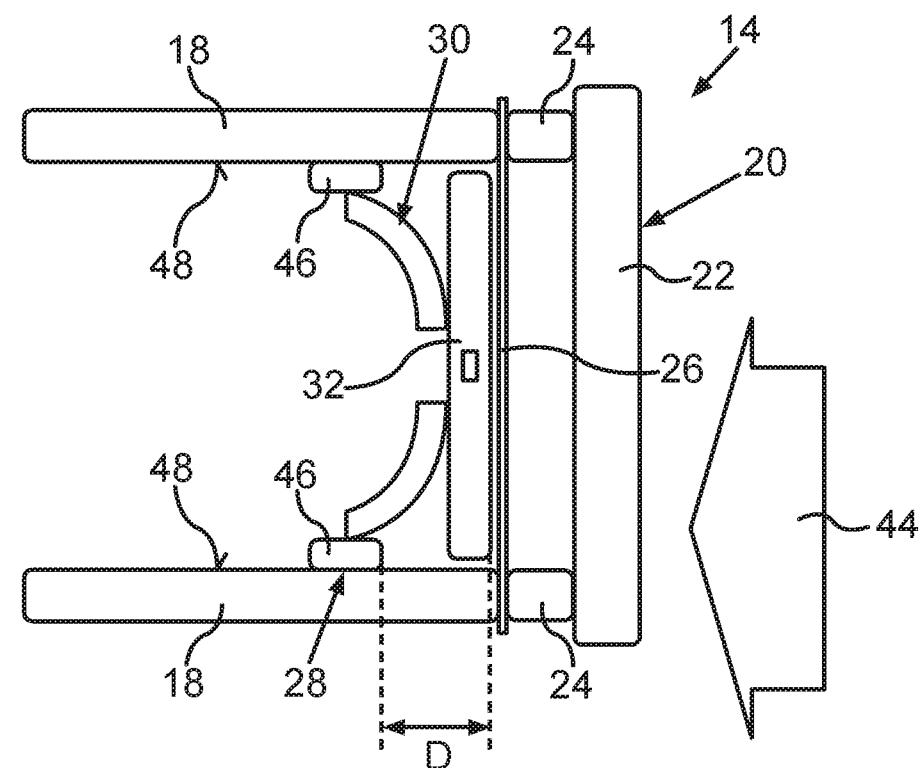
FIG. 4 a schematic top view of the front region of the bodywork structure according to FIG. 1 to 3.
Figure 10:
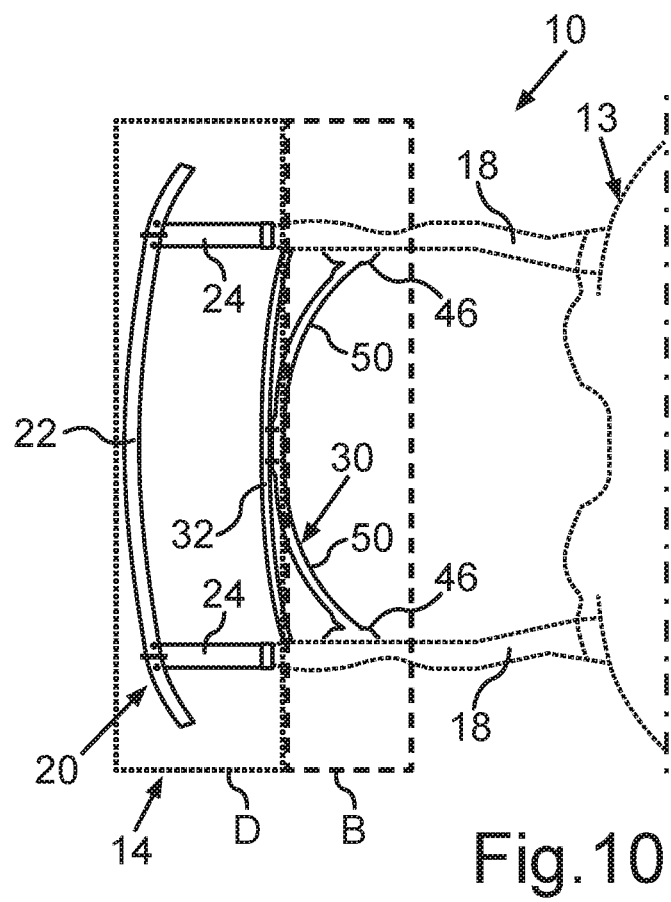
FIG. 10 is a further schematic top view of the bodywork structure according to FIG. 4.
Figure 12:
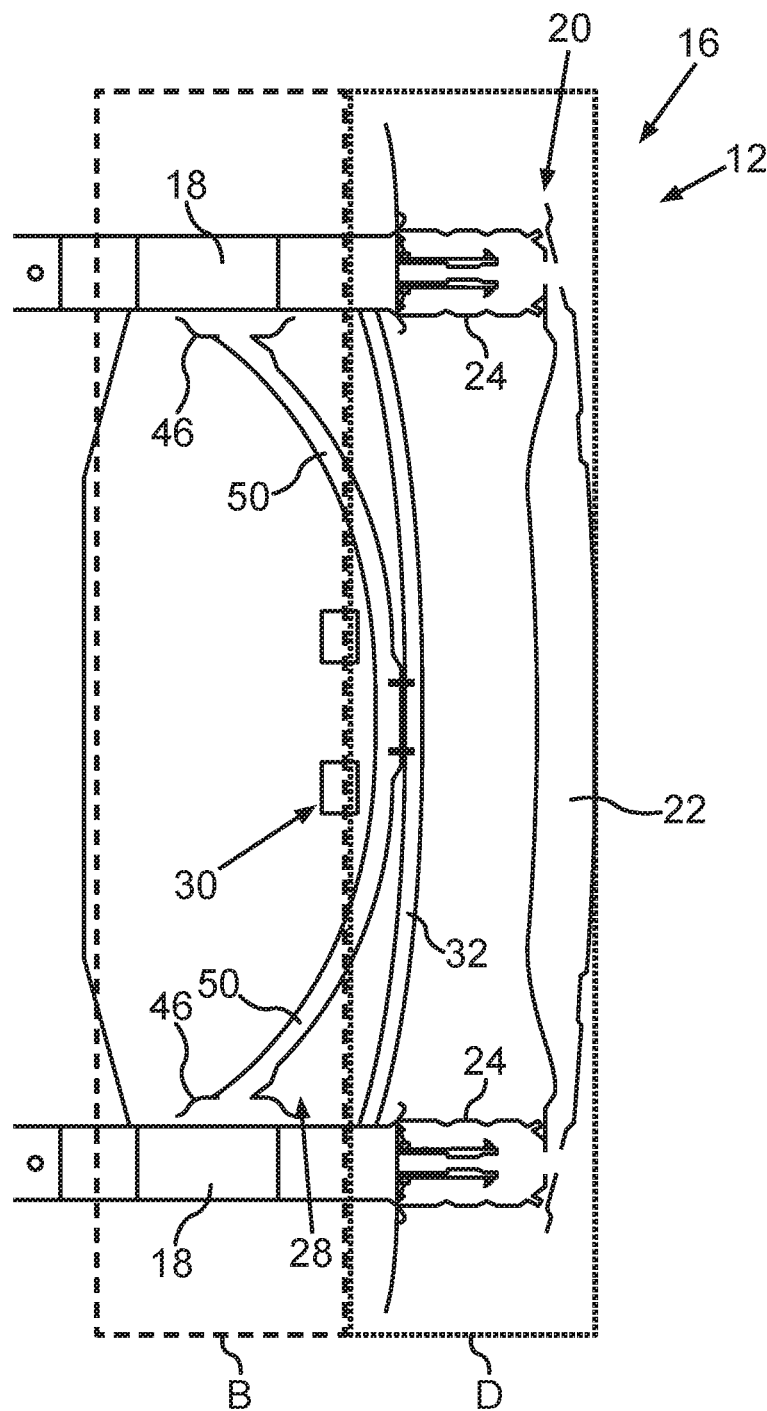
FIG. 12 is a schematic top view of the bodywork structure according to FIG. 11.

FIG. 1 shows a bodywork for a passenger vehicle in a schematic perspective view, which, in its completely manufactured state, has a conventional drive, for example, or can be formed as a hybrid or electric vehicle. On its front 10 and on its rear 12, the bodywork has respective bodywork structures 14 and 16 which are explained in more detail below. While FIGS. 4 and 10 show the bodywork structure 14 arranged on the front 10 of the bodywork in a respective schematic top view, FIG. 12 shows the bodywork structure 16 arranged on the rear 12 of the bodywork in a schematic top view. When looking at FIGS. 1, 4, 10 and 12 together, it can be seen particularly well that the respective bodywork structure 14 or 16 has two longitudinal girders 18 spaced apart from one another in the transverse direction of the vehicle (y-direction), which are exemplary components of the bodywork upper housing. The bodywork structure 14 or 16 further comprises a flexible crossmember device 20, which is attached to the longitudinal girders 18 in the longitudinal direction of the vehicle (x-direction), i.e., follows on the longitudinal girders 18. With the bodywork structure 14, the flexible crossmember device 20 is thus arranged further forwards in the longitudinal direction of the vehicle than the longitudinal girders 18. However, with the bodywork structure 16, the flexible crossmember device 20 is arranged further back in the longitudinal direction of the vehicle than the longitudinal girders 18. Thus, with the bodywork structure 14, the flexible crossmember device 20 follows further forwards on the longitudinal girders 18 in the longitudinal direction of the vehicle, while with the bodywork structure 16, the flexible crossmember device 20 follows on the longitudinal girders 18 further back in the longitudinal direction of the vehicle.

The respective flexible crossmember device 20 is preferably part of a bumper arrangement that is not depicted in more detail in the drawings and comprises bumper cladding forming a part of the outer shell of the vehicle. The respective flexible crossmember device 20 itself comprises at least one flexible crossmember 22 extending in or at least substantially in the transverse direction of the vehicle, the flexible crossmember also being referred to as the first flexible crossmember in the context of the invention present here. Furthermore, at least one or exactly one energy absorption element 24 is provided per longitudinal girder 18, the energy absorption element often being referred to as a crash box and, with an application of force acting in the longitudinal direction of the vehicle in particular (x-direction in the coordinate system common in bodywork construction) and caused by accidents, being able to be deformed by energy consumption.

The respective energy absorption element 24 is arranged between the respectively allocated longitudinal girder 18 and the flexible crossmember 22 in the longitudinal direction of the vehicle and, here, is fixed to the respective longitudinal girder 18 on one side and to the flexible crossmember 22 on the other side. The deformation behavior of the energy absorption elements 24 is designed or adjusted with respect to the longitudinal girder 18 in such a way that, in the event of an application of force caused by a collision to the flexible crossmember 22, the energy absorption elements 24 already deform in an energy-consuming manner, while the longitudinal girders 18 arranged behind still withstand the collision forces. Preferably, the longitudinal girders 18 only deform when the respective energy absorption element 24 is virtually pressed together on the block and the active crash forces exceed a threshold value predetermined by the material selection and constructive measures of the or on the longitudinal girders 18.

It can be seen particularly well in FIG. 4 that the energy absorption elements 24 are fixed to the longitudinal girders 18 on a common fixing plane 26. In the exemplary embodiment illustrated in the FIG., the fixing plane 26 runs at least substantially perpendicularly to the longitudinal direction of the vehicle (x-direction) and is here spanned in the vertical direction of the vehicle (z-direction) and the transverse direction of the vehicle (y-direction). For reasons of mounting and also for the purposes of repairs, the energy absorption elements 24 are preferably reversibly releasably fixed to the longitudinal girders 18. It is provided in a preferred embodiment that the energy absorption elements 24 are screwed to the longitudinal girders 18, such that the fixing plane 26 is a screwing or screwing-in plane in which the energy absorption elements 24 and, via these, the flexible crossmember 22 are screwed onto, and thus connected to, the longitudinal girders 18. Since the energy absorption elements 24 are connected to the longitudinal girders 18 and to the flexible crossmember 22, the flexible crossmember 22 is held on the longitudinal girders 18 by the intermediary of the energy absorption elements 24 and are thus connected to these.

According to a first embodiment variant of the bodywork structure, the energy absorption elements are respectively inserted—preferably in a form-fit manner—into the end region of the respective longitudinal girder that is hollow at least in the connection region, wherein the overlapping region of the energy absorption element and the longitudinal girder is penetrated by at least one fastening/fixing element, preferably a screw, in the transverse direction of the vehicle. The fixing plane 26 spanned in the yz-direction here runs through the fastening/fixing element and, in the case of several fastening/fixing elements that are offset to one another in the longitudinal direction of the vehicle being provided, through one of these or a centered point, for example, between the fastening/fixing elements. According to a second embodiment variant of the bodywork structure, the energy absorption elements can also be fixed on the end face side on the free end region of the respective longitudinal girder by means of a flange connection, wherein, in this case, the at least one fastening/fixing element, preferably screw, penetrates the flange in the longitudinal direction of the vehicle. The fixing plane 26 spanned in the yz-direction here runs through the flange connection.

In order to now be able to achieve particularly advantageous accident behavior in a manner that is favorable in terms of construction space, the respective bodywork structure 14 or 16 comprises a respective support framework 28, which is arranged between the longitudinal girders 18 in the transverse direction of the vehicle and, when seen in the vertical direction of the vehicle (z-direction at the height of the longitudinal girders 18. Furthermore, the respective support framework 28 is arranged behind or on the inside of the respective fixing plane 26 when seen in the longitudinal direction of the vehicle and in the direction of the application of force caused by the collision. Thus, with the bodywork structure 14 arranged on the front 10, the fixing plane 26 is arranged further forwards than the support framework 28 in the longitudinal direction of the vehicle, such that, with the bodywork structure 14, the fixing plane 26 follows the support framework 28 towards the front in the longitudinal direction of the vehicle. However, with the bodywork structure 16, the fixing plane 28 is arranged further back than the support framework 28 in the longitudinal direction of the vehicle, such that, with the bodywork structure 16, the fixing plane 26 follows the support framework towards the rear in the longitudinal direction of the vehicle.

The support framework 28, also referred to as the support framework structure, comprises a second flexible crossmember 30 that extends at least substantially in the transverse direction of the vehicle and is attached at least indirectly to longitudinal girders 18 on its ends or end regions. The flexible crossmember 30 of the support framework 28 is also referred to as the second flexible crossmember in the context of the present invention. Furthermore, the support framework 28 comprises a load divider 32 which is arranged between the flexible crossmembers 22 and 30 in the longitudinal direction of the vehicle and, here, in particular between the fixing plane 26 and the flexible crossmember 30. In principle, the load divider 32 can be formed as a straight beam with a hollow cross-section, for example. In the exemplary embodiment depicted in the Figures, the load divider 32 is provided as such a beam with a slight curvature, wherein, when seen in top view of the load divider 32, the curvature is aligned in relation to the outside of the vehicle, as is readily apparent in FIG. 7. The load divider 32 thus extends at least substantially in the transverse direction of the vehicle and, here, substantially spans the entire open space between the two longitudinal girders 18 without here being fixed on the end face side on the longitudinal girders 18. Instead, a gap or an open space is provided between the end face side of the respective longitudinal girder and the inside of the longitudinal girder 18 arranged adjacently, i.e., opposite. Here, the load divider 32 can absorb loads acting on it in the longitudinal direction of the vehicle and caused by accidents (x-forces) and transfer them to the flexible crossmember 30 arranged behind.

Relating to the functionality of the support framework 28: the load divider 32 and the flexible crossmember 30 are activated by the force arising in the event of a vehicle crash by means of an accident barrier 44 approximately in the x-direction. Here, the beam-shaped load divider 32 distributes the emerging load as flatly as possible across the width of the vehicle and presses on the flexible crossmember 30. As a result of the curved shape of the flexible crossmember 30, the force acting in the longitudinal direction of the vehicle (x-direction) is converted into a force acting in the transverse direction of the vehicle (y-direction), whereby the existing longitudinal girders 18 are deformed towards the outside of the vehicle in the y-direction by connecting the flexible crossmembers 30 via the connection consoles 46, and crash energy is transferred to the side facing away from the impact. Thus, transferring the crash forces caused by the accident from the x-direction to the y-direction and thus to the longitudinal girders 18 takes place. Here, the support framework 28 is arranged between the longitudinal girders 18 in particular in such a way that the respective longitudinal girder 18 is at least partially covered inwardly by the support framework 28 in the transverse direction of the vehicle. The respective longitudinal girders 18 are connected to one another via the respective support framework 28 in order to thus be able to keep both a deformation in the x-direction and a deformation in the z-direction particularly minimal in the construction space of the vehicle in the event of an accident, whereby excessive intrusions into the passenger vehicle or into its interior can be avoided.

Figure 2:
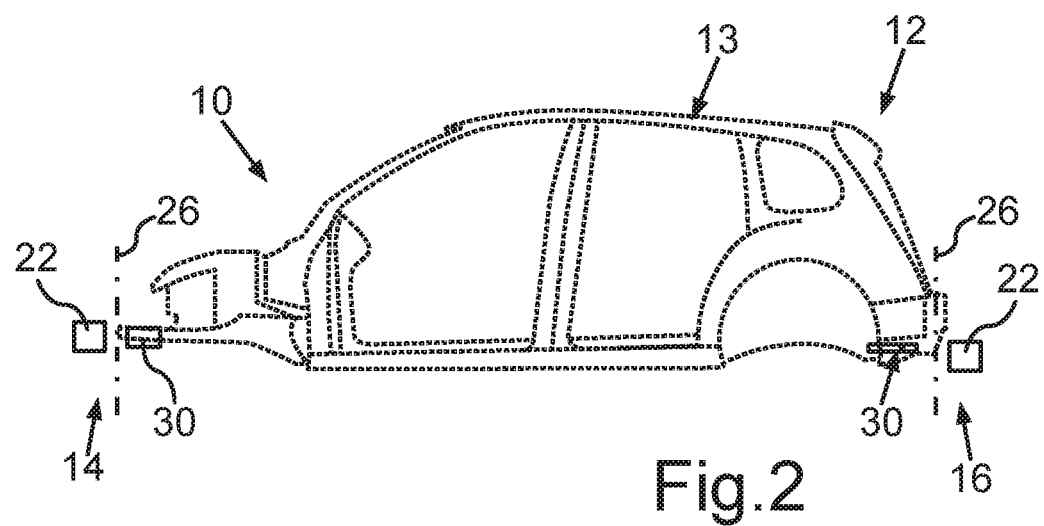
FIG. 2 is a schematic side view of the bodywork according to FIG. 1.
Figure 3:
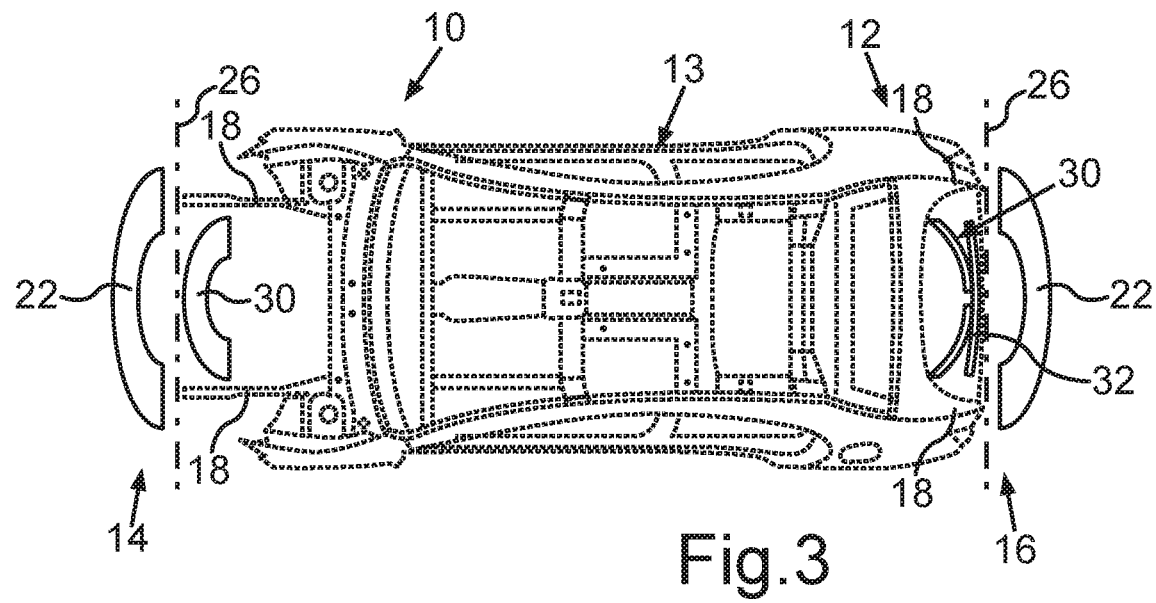
FIG. 3 is a schematic top view of the bodywork according to FIGS. 1 and 2.
Figure 5:
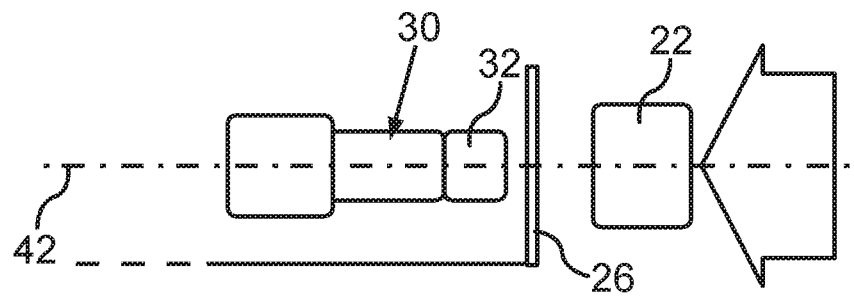
FIG. 5 is a schematic side view of the bodywork structure according to FIG. 4.

The respective bodywork structure 14 and 16 as well as its respective arrangement, in particular, in relation to the bodywork overall can be seen particularly well in FIGS. 2 and 3 that the flexible crossmembers 22 and 30 preferably arranged at the same or at least at the same height in the vertical direction of the vehicle are arranged at a distance apart from one another in the x-direction and, here, run in parallel or at least substantially in parallel to one another. It can be seen particularly well in FIG. 5 that the flexible crossmembers 22 and 30 and the load divider 32 are arranged in the vertical direction of the vehicle in such a way that respective, in particular closed, hollow cross-sections 34, 36, 38 and 40 are at least mutually covered or overlap in the direction illustrated in FIG. 5 by a dotted line 42. In doing so, a particularly high amount of accident energy can be converted into deformation energy and thus absorbed in a minimal path or in an only minimal deformation space.

Furthermore, FIG. 4 shows a very schematically depicted accident barrier 44, which collides on the front of the vehicle and thus on the bodywork structure 14. It can be seen that the accident barrier 44 has a lateral offset in relation to the centre of the vehicle yet, despite the lateral offset, is always still overlapping with one of the longitudinal girders 18, when seen in the direction of the collision, such that a support of the crash forces or introduction thereof via the end region of the longitudinal girder 18 into it takes place via the flexible crossmember 22 and the energy absorption element 24. Here, in FIG. 4, a deformation region, available for such a frontal collision, between the fixing plane 26 of the flexible crossmember 22 and respective connection consoles 46 of the flexible crossmember 30 is furthermore labeled with D. In the event of such a frontal collision, the deformation region D is available in order to convert and thus absorb accident energy into deformation energy.

In principle, it is conceivable that the second flexible crossmember 30 is directly connected to the longitudinal girders 18. However, in the exemplary embodiment illustrated in the FIG., it is provided that the second flexible crossmember 30 is connected to the longitudinal girders 18 by the intermediary of the connection consoles 46, also simply referred to as consoles, formed separately from the second flexible crossmember 30 and separately from the longitudinal girders 18. Here, the connection consoles 46 are connected to the flexible crossmember 30 and to the longitudinal girders 18. In particular, the respective connection console 46 is fixed to an inner side 48, pointing inwardly in the transverse direction of the vehicle, of the respective longitudinal girder 18, such that the second flexible crossmember 30 is connected via the connection consoles 46 and thus directly to the inner sides 48.

Figure 6:
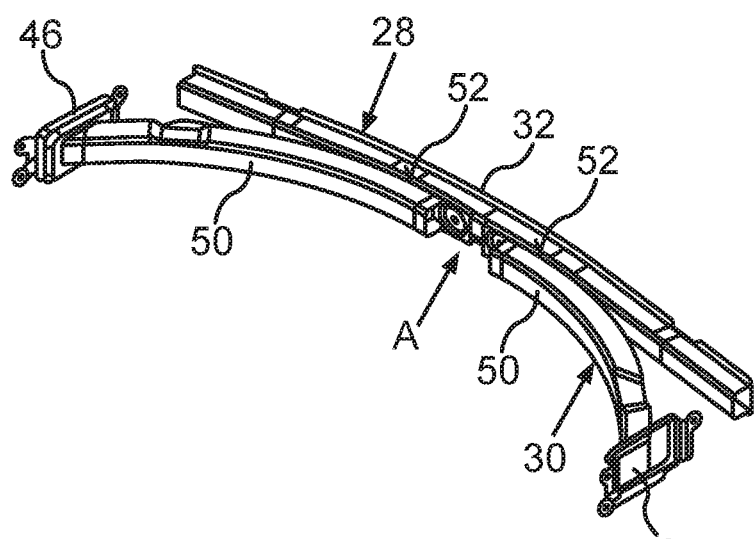
FIG. 6 is a schematic perspective view of the support framework of the bodywork structure according to FIGS. 4 and 5.

FIG. 6 shows the support framework 28, which can be used, for example, with the bodywork structure 14 or, on the other hand, with the bodywork structure 16. In the exemplary embodiment illustrated in the FIG., the load divider 32 is formed in one piece and thus as exactly one component, which can be handled and mounted as a whole. In principle, the second flexible crossmember 30 can also be formed as one piece. In the exemplary embodiment illustrated in the FIG., the second flexible crossmember 30 is formed in two parts and thus has at least or exactly two flexible crossmember parts 50 formed separately from each other. The flexible crossmember parts 50 are arranged spaced apart from each other in the transverse direction of the vehicle, such that a spacing A is provided between the flexible crossmember parts 50 in the transverse direction of the vehicle. Here, the spacing A is bypassed by the load divider 32, since the load divider 32 is at least indirectly, in particular directly, connected to the two flexible crossmember parts 50. Here, the flexible crossmember parts 50 are covered to the front or to the back in the longitudinal direction of the vehicle respectively at least partially by the load divider 32.

In top view, the second flexible crossmember 30 has a clear curvature, wherein the central region of the flexible crossmember 30 has a smaller spacing from the front of the vehicle or from the rear of the vehicle than its end regions, which are attached on the inside of the longitudinal girders 18 by means of the connection consoles 46. With a force application to the load divider in the x-direction, the bulge, curved towards the outside of the vehicle, of the flexible crossmember 30 causes these forces to be introduced into the flexible crossmember 30 and, there, forces acting in the y-direction to be laterally introduced into the longitudinal girders 18.

The load divider 32 is fixed directly, for example, to the flexible crossmember 30 or to the flexible crossmember parts 50. In particular, the load divider 32, for example, is screwed on the flexible crossmember 30, in particular onto the flexible crossmember parts 50. It can be seen particularly well from FIG. 6 that the load divider 32 is fixed directly to an end face side 52, facing towards the first flexible crossmember 22 in the longitudinal direction of the vehicle, of the flexible crossmember 30 or of the respective flexible crossmember part 50 and, in particular, directly touches the respective end face side 52.

Figure 7:
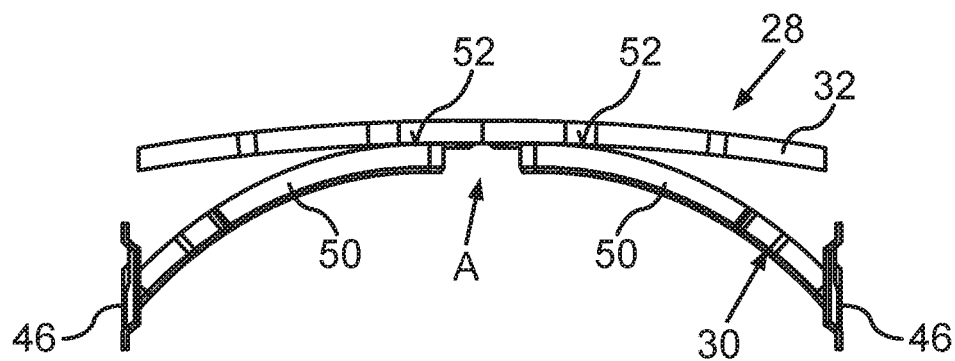
FIG. 7 is a schematic top view of the support framework according to FIG. 6.
Figure 8:
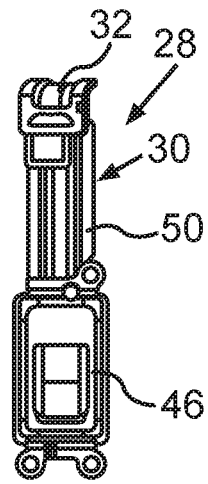
FIG. 8 is a schematic side view of the support framework according to FIG. 7.

FIG. 7 shows the support framework 28 in a schematic top view, while FIG. 8 shows the support framework 28 in a schematic side view. It readily emerges from FIG. 7 that the load divider 32 is in abutment contact with the second flexible crossmember 30 only via a relatively small part of its overall length, namely only in central regions close to the longitudinal central axis of the vehicle, while, in the remaining longitudinal regions of the load divider 32, it runs at a spacing that gets larger and larger outwardly in relation to the flexible crossmember 30, which, on one hand, is achieved by the arcuate course of the flexible crossmember 30 and, on the other hand, the load divider 32 formed as a relatively straight beam. The ends of the load divider 32 have a relatively large spacing apart from the connection consoles 46, when seen in the longitudinal direction of the vehicle.

It can be seen in FIG. 8 that the load divider 32 and the second flexible crossmember 30 or the flexible crossmember parts 50 as well as the connection consoles are arranged to be flush, such that, in the installed state, i.e., mounted on the upper housing of the bodywork, of the support framework, this or parts thereof are arranged on an imaginary horizontal plane which is spanned in the longitudinal direction and the transverse direction of the vehicle and, in the z-direction, is at the height of the longitudinal girders 18.

Figure 9:
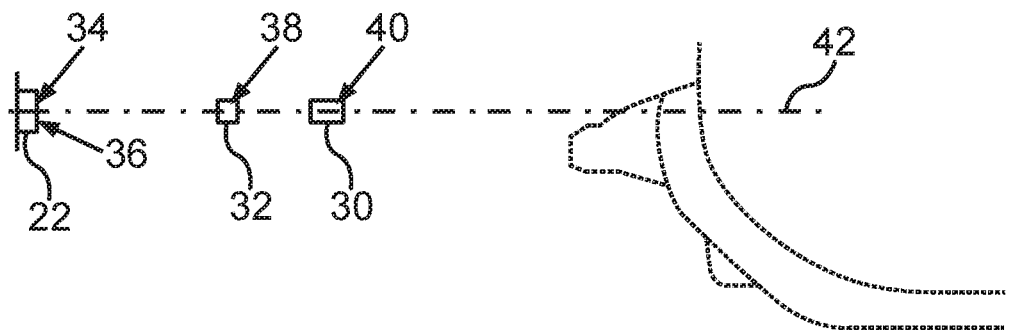
FIG. 9 is a schematic and cut-out side view of the bodywork structure according to FIG. 4.

It can be seen from FIG. 9 that the respective hollow cross-section 38 or 40 of the load divider 32 or of this flexible crossmember 30 is formed as a closed hollow cross-section. The flexible crossmember 22 has at least two chambers, for example, which are arranged one above the other in the vertical direction of the vehicle and form the respective, in particular closed, hollow cross-sections 34 and 36.

FIG. 10 shows the bodywork structure 14 in a further schematic top view. The deformation region D and a receiving region B attaching to the deformation region D at the back in the longitudinal direction of the vehicle can be seen particularly well, wherein the receiving region B, for example, comprises at least the second flexible crossmember 30 and is used to receive and support emerging rotational torques, in particular acting in the transverse direction of the vehicle, in the event of an accident. It is readily obvious from FIG. 10 that, in the depicted exemplary embodiment of the bodywork structure, the load divider 32 is arranged on the longitudinal girders 18 at least portionally at the height of the fixing plane 26 of the energy absorption elements 24 in the longitudinal direction of the vehicle, also protrudes in the direction of the first flexible crossmember 22. This arrangement does not influence the original function of the support framework.

Figure 11:
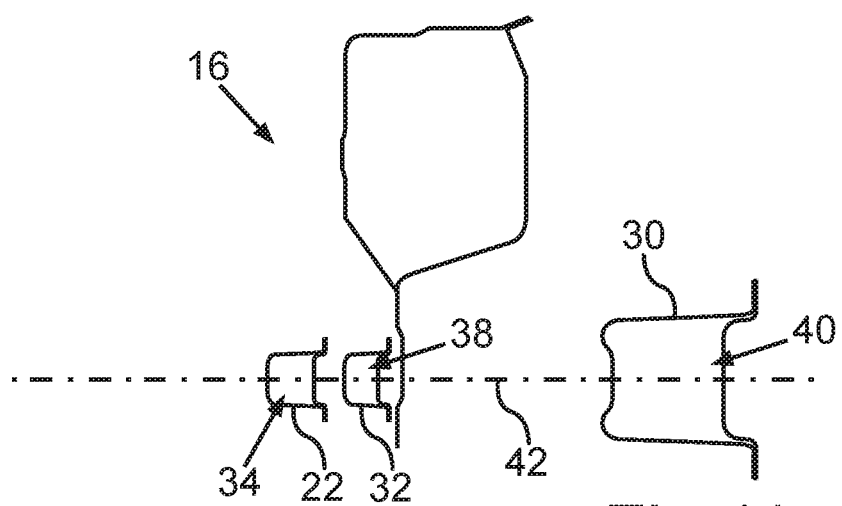
FIG. 11 a schematic and cut-out side view of the bodywork structure according to FIG. 4.

FIG. 11 shows the bodywork structure 16 on the rear 12 of the bodywork. Even in the bodywork structure 16, the flexible crossmember 22, the flexible crossmember 30 and the load divider 32 are arranged in the vertical direction of the vehicle in such a way that their respective, in particular closed, hollow cross-sections 34, 38 and 40 are mutually at least partially covered or overlap in the longitudinal direction of the vehicle. Here, the flexible crossmember 22 of the bodywork structure 16 has, for example, exactly one chamber and thus one, in particular closed, hollow cross-section 34. Moreover, FIG. 12 shows the bodywork structure 16 in a schematic top view. Here, the deformation region D and the receiving region B are shown in FIG. 12.

Figure 13:
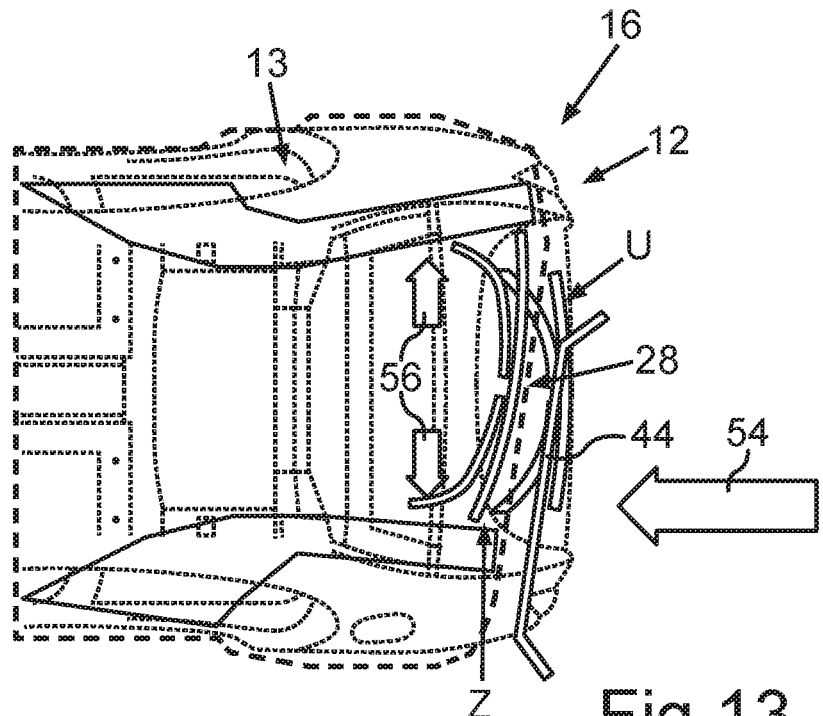
FIG. 13, sectionally, is a schematic side view of the bodywork in its rear region.
Figure 14:
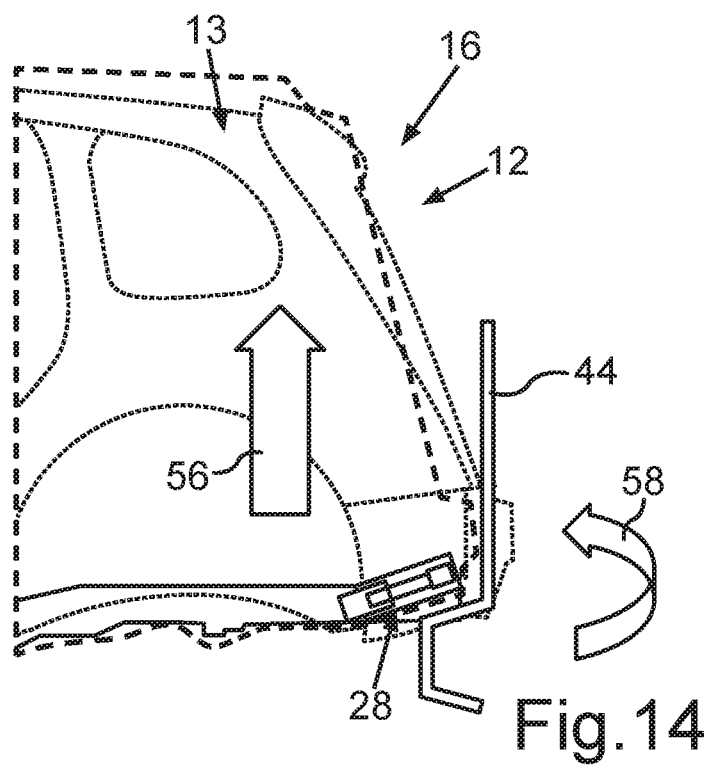
FIG. 14, sectionally, is a schematic side view of the bodywork according to FIG. 13.

In FIG. 13, a load caused by an accident is illustrated by an arrow 54, which is the result of an impact on the rear, for example, and acts from the back to the front of the bodywork structure 16 in the longitudinal direction of the vehicle. Here, a deformation, the result of the load caused by the accident, of the bodywork structure 16 is illustrated in FIG. 13. Here, arrows 56 illustrate forces, which, for example, are the result of the load caused by the accident and of the deformation of the bodywork structure 16 and act outwardly, in particular, in the transverse direction of the vehicle. In FIG. 13, a non-deformed state of the bodywork structure 16 before the rear impact is labeled with U, while the deformed state of the bodywork structure 16 resulting from the rear impact is labeled with Z. Moreover, in FIG. 14, an arrow 56 illustrates a load caused by an accident and acting upwardly, in particular, in the vertical direction of the vehicle, and an arrow 58 illustrates a rotational torque caused by an accident and acting, in particular, in the transverse direction of the vehicle. The mode of action of the bodywork structure 16 in the event of a rear impact can be seen particularly well from FIGS. 13 and 14.

Figure 15:
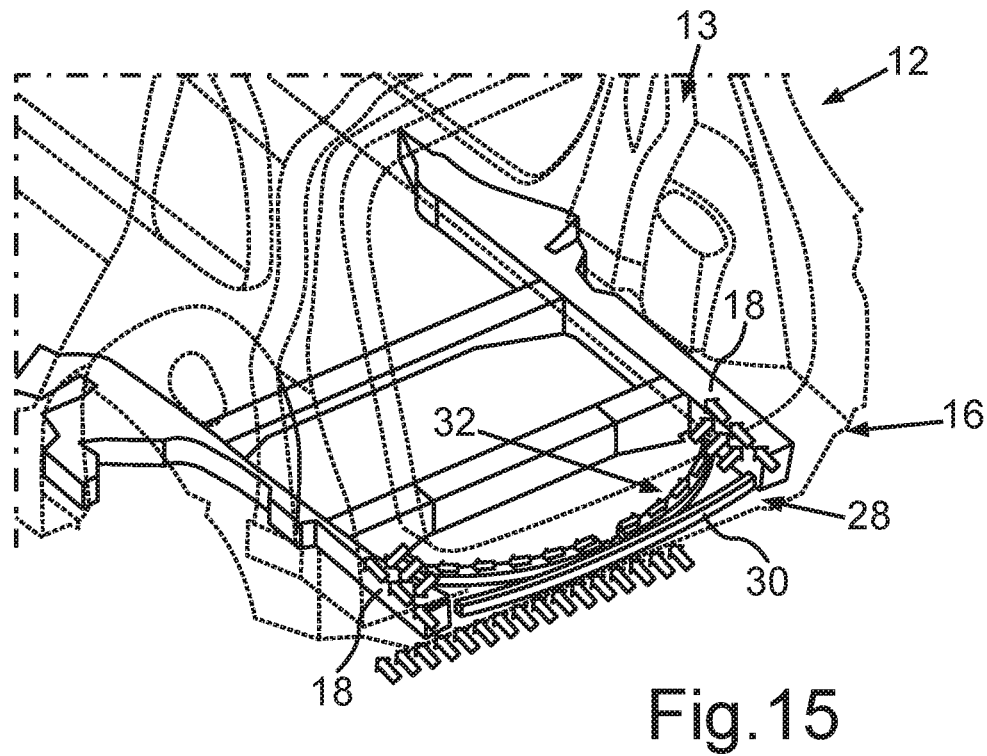
FIG. 15, sectionally, is a schematic and perspective rear view of the bodywork.
Figure 16:
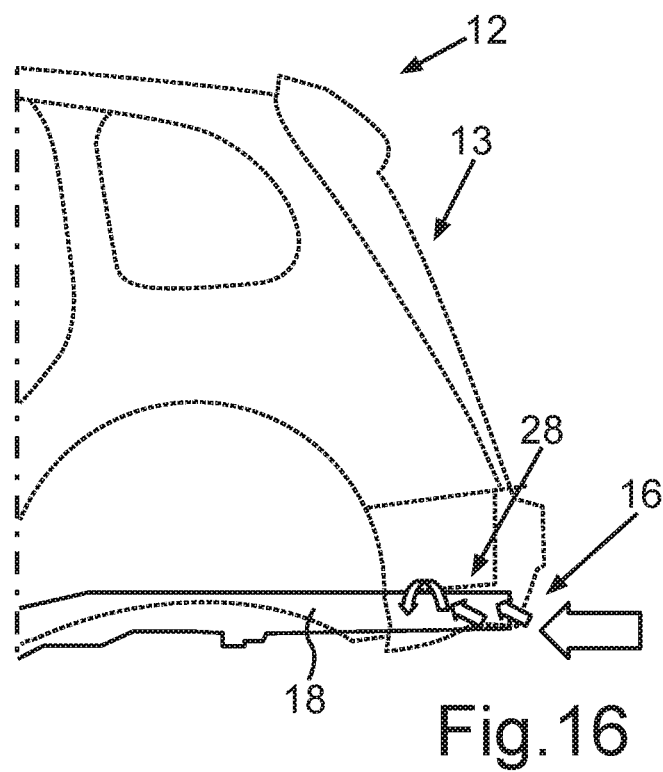
FIG. 16, sectionally, is a further schematic side view of the bodywork in its rear region.

Finally, by means of respective arrows, FIGS. 15 and 16 illustrate a force distribution that can be caused by the bodywork structure 16, as part of which force distribution, loads or forces caused by the accident are absorbed, guided and relieved in a targeted manner via the bodywork structure 16, in particular in such a way that excessive intrusions can be avoided. Overall, it can be seen from the FIG. that the respective load divider 32 of the support framework 28 is at least approximately activated by a force emerging in the event of a frontal or rear impact and, for example, when the accident barrier 44 emerges from the back of the bodywork structure 14 in the longitudinal direction of the vehicle or from the front of the bodywork structure 16 in the longitudinal direction of the vehicle, and is thus deformed, for example, from the back, with the bodywork structure 14, or from the front, with the bodywork structure 16. As a result of its activation, the load divider 32 distributes the emerging load as flatly as possible across the width of the vehicle and presses on the second inner flexible crossmember 30. The flexible crossmember 30 is convexly curved in the direction of the acting impact load and thus outwardly in the longitudinal direction of the vehicle. As a result of this curved shape of the flexible crossmember 30, in particular outwardly in the longitudinal direction of the vehicle, for example a force caused by an accident acting at least substantially in the transverse direction of the vehicle is transferred to or converted into a force acting at least substantially in the longitudinal direction of the vehicle, in particularly outwardly, whereby the longitudinal girders 18 are supplied with force by means of the connection of the support framework 28 via the connection consoles 46 in the transverse direction of the vehicle, in particular outwardly, and are also deformed when a limit force is exceeded. Thus, accident energy is transferred to the side facing away from the impact by means of the support framework 28, independently of at what point the accident force is introduced to the front of the vehicle or the rear of the vehicle in the transverse direction of the vehicle.

In particular, it is provided that the load divider 32 is connected to the longitudinal girders 18 at least or exclusively via the flexible crossmember 30 and via the possibly present connection consoles 46. As a result of this superficial connection of the support framework 28 via the connection consoles 46, the force additionally emerging in the course of the front or rear impact and illustrated by the arrow 56, for example, and acting in the vertical direction of the vehicle, as well as the rotational torque resulting from this and illustrated by the arrow 58, for example, are transferred. Here, it has been shown to be particularly advantageous when the connection consoles 46 are fixed to the respective longitudinal girders 18 in several fixing points offset in the longitudinal direction of the vehicle and in the vertical direction of the vehicle. The forces caused by an accident are additionally introduced further forwards or back in the respective longitudinal girders 18 by the arrangement, offset to the fixing plane 26 of the flexible crossmember 22, in the longitudinal direction of the vehicle, of the connection consoles 46, whereby the introduction of force into the longitudinal girders 18 is improved, since a kinking of the respective longitudinal girders 18 in the transverse direction of the vehicle can be kept low. Additionally, the deformation region D on the respective longitudinal girder 18. In particular on the longitudinal girder 18 on whose side the accident barrier 44 strikes the bodywork structure 14 or 16, emerges as a result of this arrangement between the fixing plane 26 and the connection consoles 46.

Thus, in an early phase of the accident, the longitudinal girder 18 that is arranged on the side on which the accident barrier 44 strikes the bodywork structure 14 or 16, is partially relieved in this region and, there, can deform in a controlled manner, initiated via the energy absorption elements 24, while the other longitudinal girder 18 facing away from the impact is additionally relieved, and the overall deformation is reduced in the longitudinal direction of the vehicle and in the vertical direction of the vehicle.

The invention claimed is:

1. A bodywork structure for a passenger vehicle, comprising:
    a bodywork shell construction, wherein the bodywork shell construction has two longitudinal girders spaced apart from each other in a transverse direction of the passenger vehicle and has a flexible crossmember device attached to the two longitudinal girders in a longitudinal direction of the vehicle;
    wherein the flexible crossmember device is part of a bumper arrangement and comprises a first flexible crossmember and two energy absorption elements, wherein the two energy absorption elements are respectively fixed to the two longitudinal girders and wherein the first flexible crossmember is connected to the two longitudinal girders via the two energy absorption elements; and
    a support framework, wherein the support framework is disposed between the two longitudinal girders and, as viewed in a vertical direction of the passenger vehicle, at a height of the two longitudinal girders, wherein the support framework has a second flexible crossmember that is at least indirectly connected to the two longitudinal girders and is convexly curved in a direction of the first flexible crossmember in relation to an outside of the passenger vehicle when seen in a top view of the bodywork structure;
    wherein the support framework has a load divider disposed between the first flexible crossmember and the second flexible crossmember in the longitudinal direction of the passenger vehicle and extending in the transverse direction of the passenger vehicle.

2. The bodywork structure according to claim 1, wherein the load divider is fixed to or formed on the second flexible crossmember such that free ends of the load divider are not connected to the two longitudinal girders.

3. The bodywork structure according to claim 1, wherein the load divider is formed in a shape of a beam.

4. The bodywork structure according to claim 1, wherein the load divider is at least indirectly fixed to an end face side, facing towards the first flexible crossmember in the longitudinal direction of the passenger vehicle, of the second flexible crossmember.

5. The bodywork structure according to claim 1, wherein at least in respective longitudinal regions, the first and second flexible crossmembers and the load divider have respective hollow cross-sections mutually at least partially overlapping in the longitudinal direction of the passenger vehicle.

6. The bodywork structure according to claim 1, wherein the second flexible crossmember is connected to the two longitudinal girders such that, in an event of a force application to the second flexible crossmember acting in the longitudinal direction of the passenger vehicle, a load path is formed on respective inner sides, pointing inwardly in the transverse direction of the passenger vehicle, of the respective two longitudinal girders.

7. The bodywork structure according to claim 1, wherein the second flexible crossmember is at least indirectly connected to respective inner sides of the two longitudinal girders and wherein the respective inner sides lie opposite one another.

8. The bodywork structure according to claim 1, wherein the second flexible crossmember is connected to the two longitudinal girders by respective consoles and wherein the respective consoles are formed separately from the second flexible crossmember and separately from the two longitudinal girders and are connected to the second flexible crossmember.

9. The bodywork structure according to claim 1, wherein the load divider is formed as one part or as several parts.

10. The bodywork structure according to claim 1, wherein the second flexible crossmember is formed as exactly one component.

11. The bodywork structure according to claim 1, wherein the second flexible crossmember is formed as a plurality of parts and wherein the plurality of parts include at least two flexible crossmember parts formed separately from each other and which are disposed at a spacing apart from each other in the transverse direction of the vehicle and wherein the spacing is bypassed by the load divider.

12. A mounting component for the bodywork structure according to claim 1, comprising:
   two consoles disposed on respective ends of the second flexible crossmember, wherein the two consoles fix the second flexible crossmember to respective inner sides of the two longitudinal girders;
   wherein the load divider is disposed on the second flexible crossmember.

13. A bodywork for a passenger vehicle, comprising:
   the bodywork structure according to claim 1, wherein the support framework is releasably fixed on the bodywork shell construction.

* * * * *